United States Patent
Sugimoto

(10) Patent No.: US 11,170,417 B2
(45) Date of Patent: Nov. 9, 2021

(54) SHOPPING SUPPORT SYSTEM

(71) Applicant: TOSHIBA TEC KABUSHIKI KAISHA, Tokyo (JP)

(72) Inventor: Takashi Sugimoto, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/537,015

(22) Filed: Aug. 9, 2019

(65) Prior Publication Data

US 2020/0167842 A1    May 28, 2020

(30) Foreign Application Priority Data

Nov. 27, 2018 (JP) .............................. JP2018-221635

(51) Int. Cl.
 *G06Q 30/00* (2012.01)
 *G06Q 30/06* (2012.01)
(52) U.S. Cl.
 CPC ..... *G06Q 30/0605* (2013.01); *G06Q 30/0635* (2013.01)
(58) Field of Classification Search
 None
 See application file for complete search history.

(56) References Cited

U.S. PATENT DOCUMENTS

| | | | |
|---|---|---|---|
| 2002/0065693 A1 | 5/2002 | Hattori et al. | |
| 2006/0157564 A1* | 7/2006 | Schulte | G06Q 30/02 235/383 |
| 2006/0230037 A1 | 10/2006 | Sugiyama et al. | |
| 2012/0004954 A1 | 1/2012 | Eisinger et al. | |
| 2013/0124362 A1* | 5/2013 | Katcher | G06Q 30/0633 705/26.8 |
| 2015/0242899 A1* | 8/2015 | Farhi | G06Q 30/0261 705/14.58 |

(Continued)

FOREIGN PATENT DOCUMENTS

| | | |
|---|---|---|
| JP | 2004-126987 A | 4/2004 |
| JP | 2007-272535 A | 10/2007 |

OTHER PUBLICATIONS

Tan, Wee-Kheng, Online or Offline group buying?, Aug. 1, 2010, 2010 Seventh International Conference on Fuzzy Systems and Knowledge Discovery, vol. 6, pp. 2853-2857 (Year: 2010).*

(Continued)

*Primary Examiner* — Jeffrey A. Smith
*Assistant Examiner* — Timothy J Kang
(74) *Attorney, Agent, or Firm* — Kim & Stewart LLP

(57) ABSTRACT

In one embodiment, a shopping support system has a server and a store terminal. The server stores user identification information including information of a group capable of identifying the group to which the user belongs, and shopping memo information which is associated with the user identification information, and includes information of a commodity to be purchased by the user, in a storage device. The store terminal repeatedly acquires the shopping memo information which is associated with the information of the group capable of identifying the group to which the user in whom login has been permitted belongs, from the server at a periodic prescribed timing.

8 Claims, 8 Drawing Sheets

(56) References Cited

U.S. PATENT DOCUMENTS

2016/0125507 A1\* 5/2016 Lobl .................. G06Q 30/0613
                                                    705/26.41
2017/0221132 A1\* 8/2017 Howell .............. G06Q 30/0635

OTHER PUBLICATIONS

Extended European Search Report dated Feb. 7, 2020, mailed in corresponding European Patent Application No. 19193276.3, 9 pages.
European Communication from the Examining Division dated May 4, 2021, mailed in counterpart European Patent Application No. 19193276.3, 6 pages.

\* cited by examiner

222

| RECORD No. | MEMBER CODE | FULL NAME | GROUP | TERMINAL ID | STORE Q CUSTOMER ID | STORE P CUSTOMER ID |
|---|---|---|---|---|---|---|
| 00001 | 20001 | A | M | 30001 | 40001 | 50001 |
| 00002 | 20002 | B | M | 30002 | 40002 | NONE |
| 00003 | 20003 | C | M | NONE | NONE | NONE |
| 00004 | 20004 | D | N | NONE | 40004 | NONE |
| 00005 | 20005 | E | N | 30005 | NONE | NONE |
| ... | ... | ... | ... | ... | ... | ... |

| RECORD No. | GROUP | MEMBER CODE | REGIS-TRANT | COMMODITY CODE | ARTICLE | NUMBER | FIXED PRICE | DESIRED UNI PRICE | DISCLO-SURE | POSSIBLE PURCHA-SER | CART INPUT | PUR-CHASE |
|---|---|---|---|---|---|---|---|---|---|---|---|---|
| 10001 | M | 20001 | A | 800010005 | COMMODITY A | 1 | 298 | 198 | ○ | A | A | NOT YET |
| 10002 | M | 20001 | A | 800010004 | COMMODITY B | 1 | 298 | — | × | A | NOT YET | NOT YET |
| 10003 | M | 20001 | A | 800010003 | COMMODITY C | 5 | 298 | 250 | ○ | — | B | FINISH-ED |
| 10004 | M | 20003 | C | 800010002 | COMMODITY D | 1 | 500 | — | ○ | A | A | NOT YET |
| 10005 | M | 20002 | B | | ADHESIVE PLASTER | 1 | — | 300 | ○ | — | NOT YET | NOT YET |
| ... | ... | ... | ... | ... | ... | ... | ... | ... | ... | ... | ... | ... |

223

301a 323a

SHOPPING LIST

| UPDATE | ARTICLE | NUMBER | FIXED PRICE | DESIRED UNI PRICE | REGIS-TRANT | POSSIBLE PURCHA-SER | CART INPUT | PUR-CHASE |
|---|---|---|---|---|---|---|---|---|
| | COMMODITY A | 1 | 298 | 198 | A | A | A | NOT YET |
| | COMMODITY B | 1 | 298 | - | A | A | NOT YET | NOT YET |
| | COMMODITY C | 3 | 298 | 250 | A | - | B | FINISH-ED |
| | COMMODITY D | 1 | 500 | - | C | A | A | NOT YET |
| ADDITION | ADHESIVE PLASTER | 1 | - | 300 | B | - | NOT YET | NOT YET |

HAVE YOU NOT FORGOTTEN TO BUY COMMODITY?

- COMMODITY B
- ADHESIVE PLASTER

OK

SHOPPING LIST

| UPDATE | ARTICLE | NUMBER | FIXED PRICE | DESIRED UNI PRICE | REGIS- TRANT | POSSIBLE PURCHA- SER | CART INPUT | PUR- CHASE |
|---|---|---|---|---|---|---|---|---|
| | COMMODITY A | 1 | 298 | 198 | A | A | A | NOT YET |
| | COMMODITY B | 1 | 298 | — | A | A | NOT YET | NOT YET |
| | COMMODITY C | 3 | 298 | 250 | A | — | B | FINISH- ED |
| | COMMODITY D | 1 | 500 | — | C | A | A | NOT YET |
| ADDITION | ADHESIVE PLASTER | 1 | — | 300 | B | — | NOT YET | NOT YET |

SHOPPING SUPPORT SYSTEM

CROSS-REFERENCE TO RELATED APPLICATION

This application is based upon and claims the benefit of priority from the prior Japanese Patent Application No. 2018-221635, filed on Nov. 27, 2018, the entire contents of which are incorporated herein by reference.

FIELD

Embodiments described herein relate generally to a shopping support system and a shopping support method.

BACKGROUND

In a conventional shopping support system, a customer previously stores electronic data of a shopping memo in which commodities scheduled to be purchased (commodities to be purchased) are recorded in a server and so on accessible via a network, and a plurality of customers (a group) share the above-described shopping memo. And when actually performing shopping, the above-described group can use the above-described shopping memo.

The shopping memo sharable by the group is convenient in a point that purchase of commodities to be purchased can be completed in cooperation by a plurality of the customers in the group. But, in the conventional shopping support system, an inconvenient point such that different customers in the group might purchase the same commodities is left, and thereby there is room for improvement in the conventional shopping support system.

BRIEF DESCRIPTION OF THE DRAWINGS

FIG. 3 is a diagram showing an example of the user identification information in the embodiment.

FIG. 4 is a diagram showing an example of the shopping memo information according to the embodiment.

FIG. 6 is a diagram showing a screen display example of a shopping list based on the shopping memo information according to the embodiment.

FIG. 8 is a diagram showing an example of an alert display based on the shopping memo information according to the embodiment.

DETAILED DESCRIPTION

Figure 1:
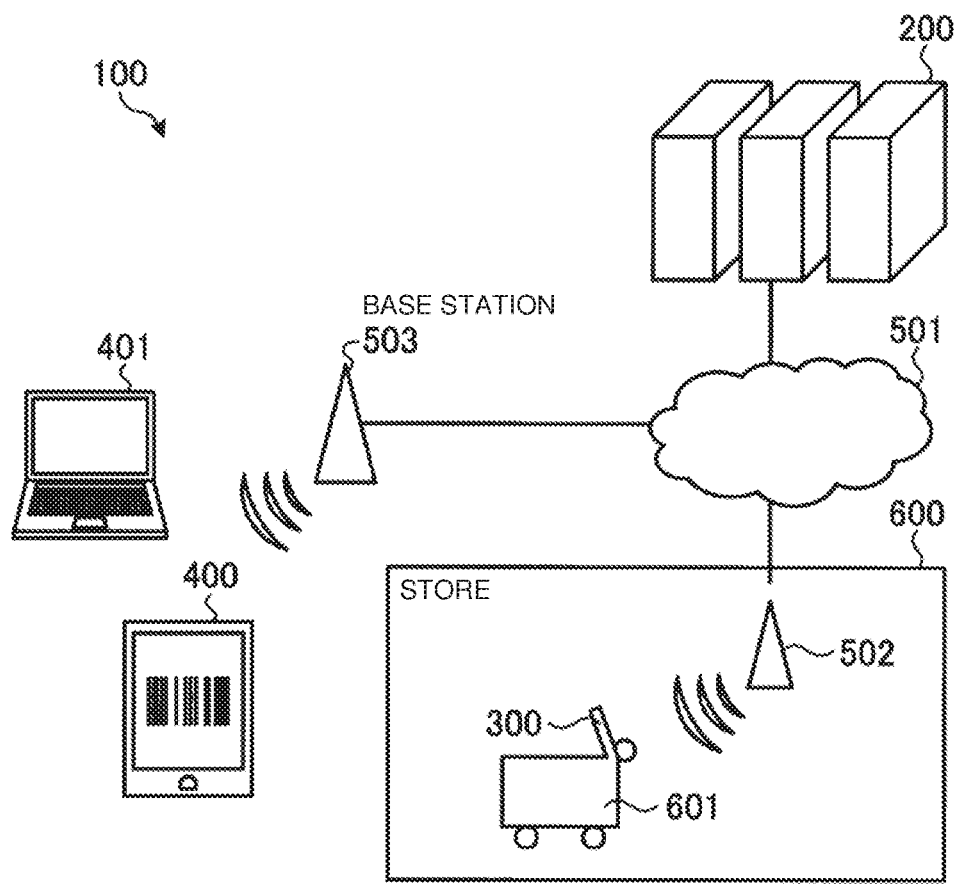
FIG. 1 is a diagram schematically showing a shopping support system according to an embodiment.

According to one embodiment, a shopping support system supports shopping of a user for purchasing a commodity in a store. The shopping support system has a store terminal which is installed in the store and is to be used by the user when the user purchases the commodity, and a server to control the store terminal. The server has a first storage device, a first communication device, and a first controller. The first storage device stores user identification information which includes a plurality of user informations related to the user, and includes, as the user information, at least information of a group capable of identifying the group to which the one or more users belong. The first storage device further stores shopping memo information which is associated with the user identification information, and includes commodity information of a commodity to be purchased of the one or more users. The first communication device performs communication with the store terminal. The first controller receives an update instruction of the shopping memo information from the store terminal via the first communication device. Further, the first controller updates the shopping memo information based on the received update instruction, and makes the first storage device store the updated shopping memo information. The store terminal has a display device, an input device, a second communication device, and a second controller. The display device displays a shopping list based on the shopping memo information. The input device inputs information necessary for the user to perform shopping. The second communication device performs communication with the server. The second controller acquires the user information of the user to perform shopping via the input device, and permits login of the user to perform the shopping, based on the user identification information including the acquired user information. The second controller repeatedly acquires the shopping memo information which is associated with the information of the group capable of identifying the group to which the user in whom the login has been permitted belongs, from the server via the second communication device, at a periodic prescribed timing. The second controller makes the display device display the shopping list, based on the acquired shopping memo information. The second controller, when commodity identification data for identifying the commodity is inputted, via the input device, judges whether the commodity information of the commodity to be purchased which is coincident with the commodity to be identified by the inputted commodity identification data is included in the shopping memo information acquired from the server. Further, the second controller, when the commodity information of the coincident commodity to be purchased is included in the shopping memo information acquired from the server, transmits the update instruction of the shopping memo information with respect to the commodity information of the coincident commodity to be purchased to the server via the second communication device.

Hereinafter, embodiments will be described using the drawings. In the drawings, the same symbols indicate the same or the similar portions. FIG. 1 is a diagram schematically showing a shopping support system 100 of the present embodiment. The shopping support system 100 supports shopping by a user in a store 600, based on shopping support information described later to be previously created by the user. The shopping support system 100 has a sever 200 and a plurality of terminal devices. The plurality of terminal devices include a store terminal 300 and a terminal device owned by a user. The terminal device owned by a user includes a user terminal 400 and/or a PC (Personal Computer) 401. The user terminal 400 and the PC 401 are used by the user mainly for creating shopping memo information, and for updating the created shopping memo information. The update of the shopping memo information by the user terminal 400 and the PC 401 includes addition of a record of a new commodity to be purchased, correction of record contents of the commodity to be purchased (the number of commodities to be purchased, a desired purchase unit price, and so on), cancel of the commodity to be purchased (deletion of a record), and so on. The store terminal 300 is used by the user mainly for updating the shopping memo information. The update of the shopping memo information by the store terminal 300 includes update of the record of the shopping memo information mainly in accordance with the shopping by the user in the store 600. The detail of update of the shopping memo information will be described later. In addition, the user in the embodiment is a user of the relevant system who has been registered as a member in the shopping support system 100. When the user is registered as the member, user identification information 222 described later, for example, is registered in the server 200.

As shown in FIG. 1, the server 200 and the store terminal 300 are communicatively connected, via a network 501 such as Internet, and an access point 502 in the store 600. In addition, the user terminal 400 and the PC 401 are communicatively connected to the server 200, via a base station 503 and the network 501. In addition, the server 200 provides a plurality of the stores 600 with information. The respective stores 600 are affiliated stores in which companies to manage the relevant stores 600 are the same, for example.

The access point 502 is installed in the store 600. The access point 502 performs wireless LAN communication with the store terminal 300, to intermediate communication of the store terminal 300 with another terminal device and the server 200 via the network 501. The detail of the server 200 will be described later.

The base station 503 performs mobile data communication with the user terminal 400, to intermediate communication of the user terminal 400 with another information processing terminal via the network 501.

The store terminal 300 is a terminal device of a tablet type, for example. The store terminal 300 is attached to each of baskets, or a plurality of carts (shopping carts 601, for example), for carrying a commodity which are installed in the store. The shopping cart 601 is a mobile body which moves in the store 600 by an operation of a user. Accordingly, the store terminal 300 moves in the store 600 along with the shopping cart 601 and the user to operate the shopping cart 601. The detail of the store terminal 300 will be described later. The user terminal 400 is a terminal device owned by a user which the user can carry inside and outside the store 600. The user terminal 400 is specifically a smartphone, for example. The user terminal 400 displays code information such as a bar code on a screen by a dedicated application. The code information indicates user information. The user information is included in the user identification information 222 described later, and is information related to the user. For example, when the user logs in the store terminal 300, the store terminal 300 reads the above-described code information displayed on the screen of the user terminal 400. The store terminal 300 reads the above-described code information to acquire the user information, and performs user authentication for permitting login. The PC 401 is a terminal device owned by a user which the user can use and cannot carry, outside the store 600. For example, the user can use the PC 401 only in the user's home, for example. In addition, the user may use the PC 401, as the terminal device owned by the user, in place of the above-described user terminal 400. In this case, when the user logs in the store terminal 300, the store terminal 300 acquires user information, using a member number described in a membership card or the like which the user carries, and a password associated with the relevant member number, and performs user authentication for login.

Figure 2:
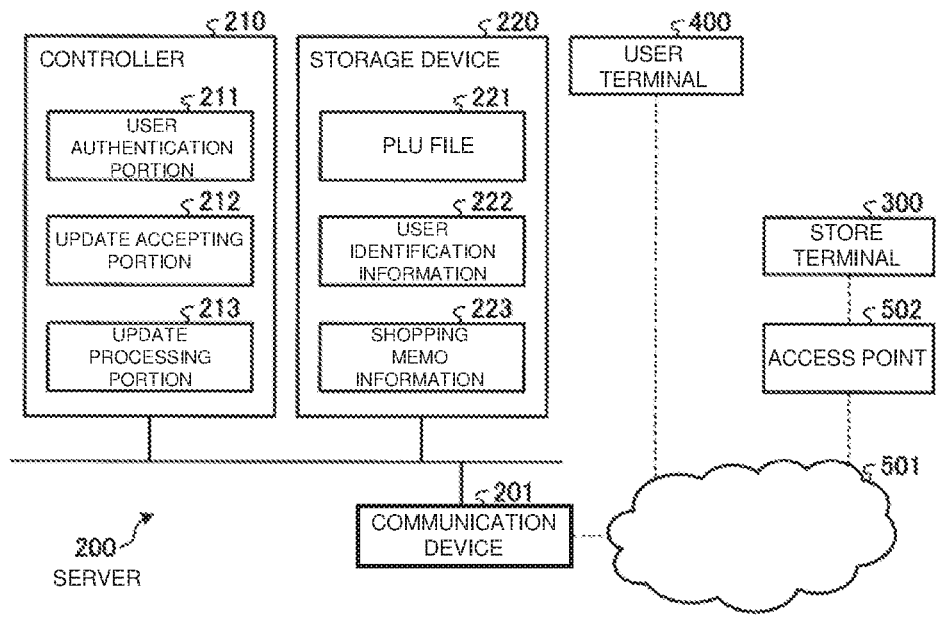
FIG. 2 is a block diagram showing an example of the server according to the embodiment.

FIG. 2 is a block diagram showing an example of the server 200. The server 200 has a communication device 201, a controller 210, a storage device 220, and so on.

The communication device 201 performs communication with another terminal device such as the store terminal 300 and the user terminal 400, via the network 501 and the access point 502.

The controller 210 is a computer, for example. That is, the controller 210 has a CPU (Central Processing Unit), a ROM (Read Only Memory), a RAM (Random Access Memory), and so on. The ROM is a storage medium to store various programs and data. The RAM is a storage medium to temporarily store various programs and various data. The CPU executes the program stored in the ROM and/or the storage device 220, and thereby the controller 210 functions, and totally controls an operation of the server 200.

The storage device 220 is a device such as an HDD (Hard Disk Drive) or an SSD (Solid State Drive). The storage device 220 stores various programs which the controller 210 (the CPU) can execute, setting information, and so on.

In addition, the storage device 220 stores a PLU (Price Look Up) file 221. The PLU file 221 stores a commodity code and information related to a commodity (commodity information) in association. The commodity code is commodity identification data which is uniquely assigned to each commodity for identifying the commodity. The commodity information includes a name, a price (a unit price), a commodity classification and so on of the commodity.

Further, the storage device 220 stores the user identification information 222 and shopping memo information 223, as shown in FIG. 2. FIG. 3 is a diagram showing an example of the user identification information 222. FIG. 4 is a diagram showing an example of the shopping memo information 223. The shopping memo information 223 is electronic data of a shopping memo in which commodity information of a commodity to be purchased of one or more users is recorded in association with at least one user information of the user identification information 222. The shopping memo information 223 is sharable by a plurality of users. Users to share the shopping memo information 223 belong to the same group described later. Share of the shopping memo information 223 includes creation and update of the shopping memo information 223 by a plurality of users. The shopping memo information 223 is created before a user actually performs shopping. Accordingly, the shopping memo information 223 is usually created by the user, using the user terminal 400 which the user can carry outside the store 600, or the PC 401 installed outside the store 600. In addition, the above-described commodity information of the shopping memo information 223 may be the same data as the above-described commodity information stored in the PLU file 221, for example, or may be data of a part of the above-described commodity information stored in the PLU file 221. In the present embodiment, it is supposed that the both are the same data for the convenience of description. The user identification information 222 is data which can identify one or more users who are members registered in the shopping support system. That is, the user identification information 222 is data which can identify one or more users permitted to create and update the shopping memo information 223. The user identification information 222 is associated with the shopping memo information 223.

The user identification information 222 shown in FIG. 3 is stored in the storage device 220 in a form of a table. The user identification information 222 includes a record for each user. Each record included in the user identification information 222 in the relevant example includes a plurality of user informations related to the user. Specifically, each record includes, as a plurality of the user informations, respective informations of "record number", "member code", "full name", "group", "terminal ID", "customer ID of store Q", and "customer ID of store P", as shown in FIG. 3.

"Record number" is an ID (identification data) of each record which is unique in the table of the user identification information 222. "Member code (member number)" is a value different for each user (namely, a member) in the relevant table, and is an ID which can individually identify the user in this shopping support system 100. "Full name" is information of a name of a user. The name of the user is mainly a full name, but may be only a given name or only a family name, or may be a pet name, or the like. The information of "group" is information of a group which can identify a group to which one or more users belong. The information of "group" is information of a group name, for example, for collectively associating a plurality of users such as a family with each other, for example. In the example shown in FIG. 3, the users (full name: A, B, C) of the first to third records belong to the same group "M".

"Terminal ID" of the user identification information 222 shown in FIG. 3 is registered when the portable user terminal 400 such as a smartphone is used, as the terminal device owned by a user, and is a value unique to the terminal device, and is data which can identify the terminal device. For example, in the first record (record No.: 00001), the user terminal 400 is registered, as the terminal device which the user (full name: A) uses, and the terminal ID thereof is "30001". When the PC 401 is used as the terminal device owned by a user, the terminal ID is written as "none". For example, in the third record (record No.: 00003), the terminal which the user (full name: C) uses is not registered (written as "none"). This means that the user of the third record (full name: C) uses the PC 401, for example, as the terminal device owned by the user.

"Customer ID of store Q" and "customer ID of store P" of the user identification information 222 shown in FIG. 3 are respectively IDs (identification data) to be issued to the users registered as customers in the stores Q, P. For example, the user (full name: A) of the first record (record No.: 00001) is registered as customers in both of the store Q and the store P, and the customer ID of the store Q is "40001", and the customer ID of the store P is "50001". For example, the user (full name: B) of the second record (record No.: 00002) is registered as a customer in the store Q (customer ID: 40002), but is not registered in the store P. For example, the user (full name: C) of the third record (record No.: 00003) is not registered as a customer in any store of the store Q and the store P (written as "none").

The shopping memo information 223 shown in FIG. 4 is stored in the storage device 220 in a form of a table. The shopping memo information 223 includes a record for each commodity to be purchased of a user. The record included in the shopping memo information 223 in the relevant example includes "record number", information of "group", information of "member code", and information of "registrant". Further, the record of the shopping memo information 223 includes respective informations of "commodity code", "article", "number", "fixed price", "desired unit price", "disclosure", "possible purchaser", "cart input", "purchase", as the commodity informations of the commodity to be purchased of the user.

"Record number" of the shopping memo information 223 shown in FIG. 4 is an ID (identification information) of each record which is unique in the relevant table. The information of "member code" is an ID of the user (the member) who has registered the relevant record, and corresponds to the information of "member code" of the user identification information 222 of FIG. 3. The information of "registrant" is a full name and so on of the user (the member) who has registered the relevant record, and corresponds to the information of "full name" of the user identification information 222. The information of "group" is a group to which the user (the member) who has registered the relevant record belongs, and corresponds to the information of "group" of the user identification information 222 of FIG. 3. That is, the record of the shopping memo information 223 includes the information and so on of "group" as described above, and thereby is associated with corresponding identification information of the user identification information 222. In addition, the user who has registered the record is a user who has been permitted to log in the user terminal 400 or the PC 401, in order to register the record of the commodity to be purchased in the shopping memo information 223. Hereinafter, the user who has been permitted to log in the user terminal 400, the PC 401, or the store terminal 300, in order to register the record may be simply called a login user.

The record of the shopping memo information 223 shown in FIG. 4 is created, each time the member (the user) having "member code" included in the user identification information 222 of FIG. 3 registers the commodity information of the commodity to be purchased, using a prescribed UI (User Interface). The relevant UI is an operation device and a display device of the user terminal 400 or the PC 401. The server 200 searches the PLU file 221, using a keyword related to the commodity inputted from the user terminal 400 or the PC 401 which the user (the member) is logging in, for example. The server 200 displays the commodity information of the commodity extracted by this search as an option on the above-described UI. And, when receiving designation by the user, such as selection from the above-described option, the number thereof, and so on, the server 200 additionally registers the record in the shopping memo information 223.

"Commodity code" of the shopping memo information 223 shown in FIG. 4 is associated with the commodity which the user has selected, in the PLU file 221. "Article" is information of a name of the commodity (a commodity name). "Number" is a number which the user has designated, and is information of a purchase scheduled number of the relevant commodity. "Fixed price" is information of a price associated with the relevant commodity in the PLU file 221.

In addition, the registration of the commodity code in the shopping memo information 223 is not essential. For example, when the user selects a commodity to be purchased from the option of the commodity to be displayed on the above-described UI, based on the above-described search of the PLU file 221, and registers the commodity information of the relevant commodity to be purchased in the shopping memo information 223, the commodity information such as the commodity code, the name of the commodity corresponding to the commodity code (corresponds to the information of "article"), the fixed price of the commodity which are stored in the PLU file 221 is registered in the shopping memo information 223. In contrast, when the user does not select a commodity to be purchased from the option of the commodity to be displayed on the above-described UI, but directly inputs a name of a commonly-used commodity (for example, "adhesive plaster") from the above-described UI, and registers the information of "article" in the shopping memo information 223, since informations of the commodity code and the fixed price are unclear, the informations of the commodity code and the fixed price are set to be blank in the relevant record of the shopping memo information 223 of FIG. 4. For example, the fifth record (record number:

10005) is an example in which the name of the commonly-used commodity (for example, "adhesive plaster") is registered as the information of "article".

The information of "desired unit price" of the shopping memo information 223 shown in FIG. 4 is a unit price of the commodity which the user may pay when purchasing the relevant commodity to be purchased, and is inputted by the user using the above-described UI. However, the registration of the information of the relevant "desired unit price" is not essential. When "desired unit price" is not inputted by the user, "desired unit price" is set to be blank in the shopping memo information 223 of FIG. 4. For example, the fourth record (record number: 10004) in FIG. 4 is an example in which the information of "desired unit price" is not registered. The information of "disclosure" is setting as to whether or not purchase schedule of the relevant commodity to be purchased is disclosed to a different user (member) belonging to the same group as the user who has registered the record of the shopping memo information 223. When registering the information of the relevant "disclosure", with respect to the commodity to be purchased, in the shopping memo information 223, the user performs a selection operation of the information of the relevant "disclosure", using the above-described UI. However, the selection operation of the information of the relevant "disclosure" is not essential, and when the above-described selection operation has not been performed, "to be disclosed" ("◯" as display) shall be selected basically. For example, in the first record (record number: 10001), "to be disclosed" is set, as the information of "disclosure". Accordingly, the first record is also disclosed to the other users (full name in FIG. 3: B, C) belonging to the same group "M" as the user (registrant: A) who has registered the relevant record. For example, in the second record (record number: 10002), "not to be disclosed" ("X" as display) is set, as the information of "disclosure". Accordingly, the second record is not disclosed to the other users (full name in FIG. 3: B, C) other than the user (registrant: A) who has registered the relevant record. The information of "possible purchaser" is the information of "full name" (refer to FIG. 3) of a user assigned as a person in charge of purchasing the relevant commodity to be purchased. When registering the information of "possible purchaser", with respect to the commodity to be purchased, in the record of the shopping memo information 223, the user performs an operation to select "possible purchaser", from the informations of "full name" of the user oneself and the other user belonging to the same group which are to be displayed on the above-described UI, for example. However, the selection operation of the relevant "possible purchaser" is not essential. When the above-described selection operation of "possible purchaser" by the user has not been performed, the possible purchaser is not limited ("-" as display). In addition, when the above-described selection operation of "possible purchaser" by the user has not been performed, the login user may be assigned as "possible purchaser". For example, regarding the commodity (article: commodity A) of the first record (record number: 10001), the user (registrant: A) who has performed registration, namely, the login user oneself is the possible purchaser. In addition, regarding the commodity (article: commodity C) of the third record (record number: 10003), for example, the possible purchaser is not limited ("-" as display).

The information of "cart input" of the shopping memo information 223 shown in FIG. 4 is the information of "full name" of the user who has inputted the commodity to be purchased into the shopping cart 601. When the commodity to be purchased is inputted into the shopping cart 601, the information (refer to the user identification information 222 of FIG. 3) of "full name" of the user who is logging in the store terminal 300 attached to the relevant shopping cart 601 is registered as the information of "cart input" in the relevant record of the shopping memo information 223. In addition, judgment whether or not the commodity to be purchased has been inputted into the shopping cart 601 is performed, based on whether or not a code symbol (a bar code and so on) attached to an appearance of the commodity to be purchased has been read by a reading device 303 described later of the store terminal 300, for example. That is, when the code symbol attached to the appearance of the commodity to be purchased has been read by the reading device 303 described later of the store terminal 300, for example, it is judged that the relevant commodity to be purchased has been inputted into the shopping cart 601. In other words, when the code symbol attached to the appearance of the relevant commodity to be purchased has not been read by the reading device 303, it is judged that the relevant commodity to be purchased has not been inputted into the shopping cart 601. For example, in the first record (record number: 10001), the user in whom the information of "full name" in the user identification information 222 is "A" is registered, as the information of "cart input". That is, it is found that the commodity (article: commodity A) of the first record has been inputted already into the shopping cart 601 by the user in whom the information of "full name" in the user identification information 222 is "A". Specifically, in the case of the first record, the user (registrant: A) oneself who has registered the first record uses the shopping cart 601, and logs in the store terminal 300 attached to the shopping cart 601 to perform shopping. And the user (registrant: A) oneself who has registered the first record has made the reading device 303 read the code symbol attached to the appearance of the commodity "A". For example, in the third record (record number: 10003), the user in whom the information of "full name" in the user identification information 222 is "B" is registered, as the information of "cart input". That is, it is found that the commodity to be purchased (article: commodity C) of the third record has been inputted already into the shopping cart 601 by the user in whom the information of "full name" in the user identification information 222 is "B". Specifically, in the case of the third record, a user ("full name" in the user identification information 222: B) different from the user (registrant: A) who has registered the third record, uses the shopping cart 601, and logs in the store terminal 300 attached to the shopping cart 601 to perform shopping. And the user in whom the information of "full name" in the user identification information 222 is "B" has made the reading device 303 read the code symbol attached to the appearance of the commodity "C". In addition, in the second record (record number: 10002), for example, data of "not yet" is registered in place of the information of "full name" in the user identification information 222, as the information of "cart input". The data of "not yet" in the information of "cart input" is data indicating a state in which the commodity to be purchased of the name of the commodity registered in the information of "article" has not been inputted into the shopping cart 601. Accordingly, it is found that the commodity to be purchased (article: commodity B) of the second record has not been possibly inputted into the shopping cart 601 yet. The information of "purchase" indicates whether or not settlement of the relevant commodity has been finished already. For example, in the first record (record number: 10001), data of "not yet" is registered, as the information of "purchase". The data of "not yet" in the information of "purchase" is data indicating that settlement of the relevant commodity to be purchased has not been finished. Accordingly, settlement of the commodity to be purchased of the first record (article: commodity A) has not been finished. In addition, in the third record (record number: 10003), for example, data of "finished" is registered, as the information of "purchase". Accordingly, settlement of the commodity to be purchased of the third record (article: commodity C) has been finished.

The description will be returned to FIG. 2. The CPU executes the program stored in the ROM and the storage device 220, and thereby the controller 210 functions as a user authentication portion 211, an update accepting portion 212, and an update processing portion 213.

The user authentication portion 211 of the controller 210 performs user authentication of a user (a member), using the user identification information 222. When a user accesses the server 200 from the user terminal 400 that is a terminal device owned by the user, the user authentication portion 211 can authenticate the user by the terminal ID of the relevant user terminal 400. In addition, when the user accesses the server 200 from the PC 401, the user authentication portion 211 performs user authentication, using a member number described in a membership card or the like, and a password associated with the relevant member number.

In addition, when the user (the member) accesses the server 200 via the store terminal 300, the user authentication portion 211 judges that the user authentication has been performed, when user identification information (a user information acquisition portion 311 and user identification information 322) has been acquired in the store terminal 300. In addition, in the shopping support system 100, a state in which the user authentication has been performed is set to be a login state. In addition, a user (a member) who has been user-authenticated is a login user.

The update accepting portion 212 of the controller 210 accepts an instruction to update the shopping memo information 223 by a user whom the user authentication portion 211 has authenticated. The update processing portion 213 of the controller 210 updates the shopping memo information 223, based on the instruction which the update accepting portion 212 has accepted.

Figure 5:
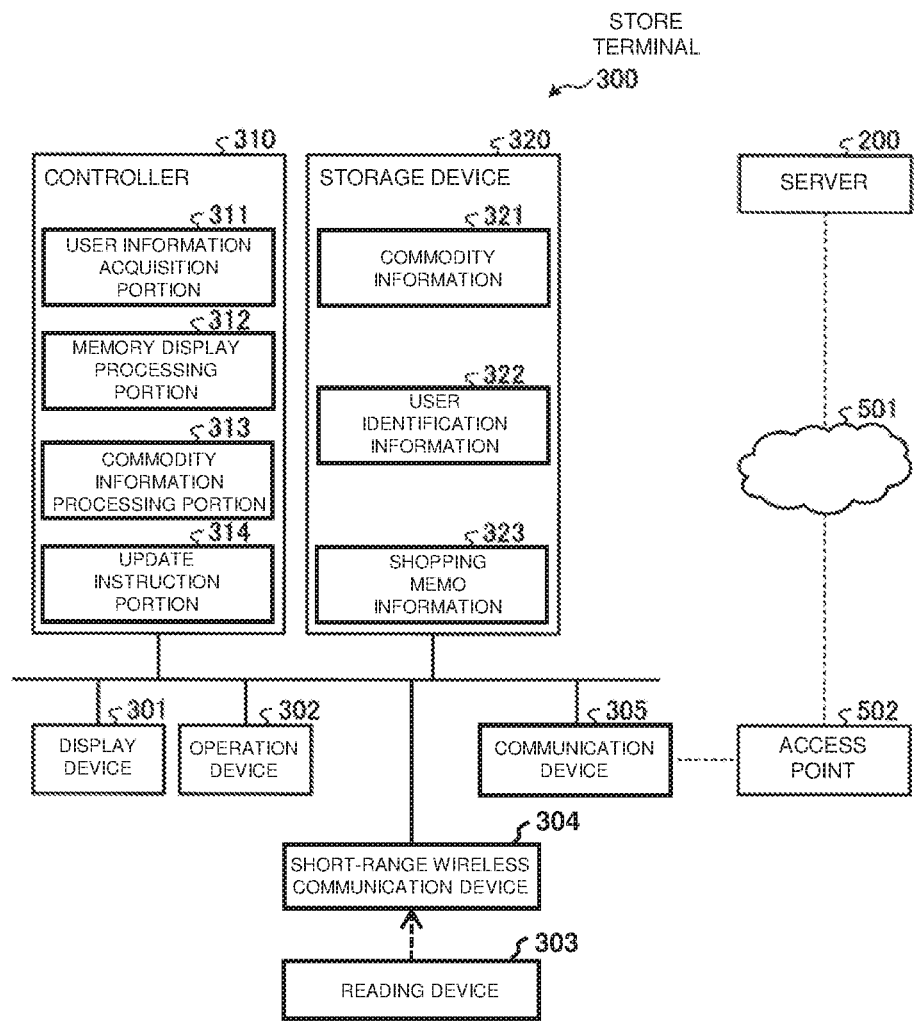
FIG. 5 is a block diagram showing an example of the store terminal according to the embodiment.

FIG. 5 is a block diagram showing an example of the store terminal 300. The store terminal 300 has a display device 301, an operation device 302, the reading device 303, a short-range wireless communication device 304, a communication device 305, a controller 310, a storage device 32, and so on.

The store terminal 300 is a terminal device of a tablet type attached to a basket or a cart (the shopping cart 601, for example) for carrying a commodity which is installed in the store. The display device 301 is a liquid crystal device, for example, and displays information to a user to use the shopping cart 601. The operation device 302 is a touch panel, for example, and is provided over the display device 301, and accepts an operation from the user in accordance with the display content of the display device 301.

The reading device 303 reads a code symbol such as a bar code attached to an appearance of a commodity to obtain a commodity code which the code symbol indicates, and outputs it to the short-range wireless communication device 304. The commodity code is information to identify the commodity. In addition, the reading device 303 reads code information to be displayed on a screen of the user terminal 400, to obtain at least one user information included in the user identification information 322, and outputs it to the short-range wireless communication device 304. The short-range wireless communication device 304 receives the output from the reading device 303. The short-range wireless communication device 304 transmits the output from the reading device 303 to the controller 310.

The communication device 305 performs communication with another terminal device such as the server 200, via the network 501 or the access point 502.

The controller 310 is a computer, for example. That is, the controller 310 has a CPU, a ROM, a RAM, and so on. The ROM is a storage medium to store various programs and data. The RAM is a storage medium to temporarily store various programs and various data. The CPU executes the program stored in the ROM or the storage device 320 and thereby the controller 310 functions and totally controls an operation of the store server 300.

The storage device 320 is a device such as an SSD. The storage device 320 stores various programs which the controller 310 (the CPU) can execute, setting information, and so on. In addition, the storage device 320 stores commodity information 321, the user identification information 322, and shopping memo information 323, as shown in FIG. 5.

The CPU executes the program stored in the ROM or the storage device 320, and thereby the controller 310 functions as a user information acquisition portion 311, a memo display processing portion 312, a commodity information processing portion 313, and an update instruction portion 314.

The user information acquisition portion 311 acquires at least one user information (for example a terminal ID) included in the user identification information 222 shown in FIG. 3, based on the code information such as the bar code read from the display screen of the user terminal 400 by the reading device 303. The user information acquisition portion 311 makes the storage device 320 store at least the one acquired user information as the user identification information 322. That is, the user identification information 322 to be stored in the storage device 320 is at least the one user information out of a plurality of the user informations (refer to FIG. 3) included in the user identification information 222 to be stored in the storage device 220 of the server 200.

In addition, as a method of performing user authentication not by the user terminal 400 but by the store terminal 300, the user information acquisition portion 311 accepts an input of a member number described in a membership card or the like and a password associated with the relevant member number, for example, by the operation device 302, and acquires the user identification information 322 that is at least one user information included in the user identification information 222.

In addition, when the user identification information 322 is acquired by the user information acquisition portion 311, user authentication is performed by the user authentication portion 211 of the server 200.

The memo display processing portion 312 repeatedly acquires the shopping memo information 223 which is associated with the user identification information 322 that is at least one user information included in the user identification information 222 which the user information acquisition portion 311 has acquired, from the storage device 220 of the server 200, at a periodic prescribed timing. Further, the memo display processing portion 312 repeatedly acquires the shopping memo information 223 which is associated with the user identification information 322 of the other users (full name: B and C) belonging to the same group (group: M) as the user (for example, full name: A) to be identified by the user identification information 322, from the storage device 220 of the server 200, at a periodic prescribed timing. That is, the shopping memo information 223 which the memo display processing portion 312 acquires repeatedly at the periodic prescribed timing is a record of the shopping memo information 223 which is associated with the information "M" of the group to which the user (for example, full name: A) to be identified by the user identification information 322 belongs. The memo display processing portion 312 makes the display device 301 display a shopping list based on the acquired shopping memo information 223, and makes the storage device 320 store the acquired shopping memo information 223 as the shopping memo information 323. That is, the shopping memo information 323 to be stored in the storage device 320 has the same information configuration as the shopping memo information 223 (refer to FIG. 4) to be stored in the storage device 220 of the server 200. In addition, the shopping list is commodity information of the commodity to be purchased for supporting the user's shopping which is to be created based on the shopping memo information 223. The detail of the shopping list will be described later.

Here, FIG. 6 shows a display example of a screen 301a in which a shopping list 323a based on the shopping memo information 323 is displayed by the display device 301. The login user of the store terminal 300 in this example is the user (the member) in whom the information of "full name" in the user identification information is "A", and the information of the group to which the relevant user belongs is "M" (refer to the user identification information 222 of FIG. 3). Accordingly, the memo display processing portion 312 acquires the shopping memo information 223 associated with the group "M", from the shopping memo information 223 of the server 200. And the memo display processing portion 312 displays the shopping list 323a based on the shopping memo information 223 associated with the group "M" in the screen 301a of FIG. 6.

In addition, in the display of the screen 301a of the shopping list 323a based on the shopping memo information 323, the whole information of the shopping memo information 323 is not displayed. In the screen 301a, the shopping list 323a including commodity information which a person mainly uses for identifying a commodity in general is displayed. The shopping list 323a includes information such as a commodity name, a number, a fixed price, a desired unit price, a registrant, a possible purchaser, cart input, purchase, as the commodity information which a person mainly uses for identifying a commodity in general. In addition, the shopping list 323a includes update information indicating the presence or absence of update of the shopping memo information 323. For example, when the shopping memo information 323 is updated (for example, addition of a record) after the shopping list 323a has been displayed in the screen 301a, the shopping list 323a including update information indicating that effect with respect to the updated record of the shopping memo information 323 is displayed in the screen 301a. Specifically, the memo display processing portion 312 displays "addition" as shown in FIG. 6, in association with the commodity information corresponding to the updated record. In addition, the memo display processing portion 312 judges the presence or absence of update of the shopping memo information 323 after displaying the shopping list 323a, by comparison of the shopping memo information 223 to be acquired at the above-described prescribed timing with the shopping memo information 323 which is previously stored in the storage device 320. That is, when the shopping memo information 223 to be acquired at the above-described prescribed timing and the shopping memo information 323 which is previously stored in the storage device 320 are different, the memo display processing portion 312 judges that the shopping memo information 323 has been updated. The update in this case may be called an update 1 so as to discriminate it from another update, in the following description. In addition, the update 1 is addition of a record, deletion of a record, and correction of record contents in the shopping memo information 223 of the server 200 performed by the user mainly using the user terminal 400 or the PC 401.

The commodity information processing portion 313 searches the PLU file 221 using the commodity code to be outputted from the reading device 303 to obtain commodity information corresponding to the commodity code. The commodity information processing portion 313 makes the storage device 320 store the above-described obtained commodity information as the commodity information 321.

When the commodity information which the commodity information processing portion 313 has made the storage device 320 store as the commodity information 321 is coincident with the commodity information of the commodity to be purchased included in the shopping memo information 323, the update instruction portion 314 performs a negation processing to the record of the shopping memo information 323 with respect to the commodity information of the relevant commodity to be purchased, to update the relevant record. The update in this case may be called an update 2 so as to discriminate it from the above-described update 1, in the following description. In addition, the above-described negation processing is to register the information of "full name" of the login user in the information of "cart input" of the relevant record. In addition, the negation processing in the update 2 is performed when the commodity code is outputted from the reading device 303, as described above. However, when the above-described outputted commodity code is not coincident with the commodity information of the commodity to be purchased included in the shopping memo information 323, the negation processing in the update 2 is not performed. That is, the negation processing of this case is automatically performed by the reading of the commodity code by the reading device 303, and the above-described update 2 is update performed by this automatic negation processing. In addition, the update instruction portion 314 also updates the display contents of "cart input", in the shopping list 323a in the screen 301a shown in FIG. 6, in accordance with the above-described update 2 of the shopping memo information 323.

Further, the update instruction portion 314 sends an instruction to update the record of the shopping memo information 223 of the server 200 corresponding to the record of the shopping memo information 323 which has been changed by the above-described update 2 to the update accepting portion 212 of the server 200.

In addition, the update instruction portion 314 accepts a negation processing of a record by hand. The negation processing by hand is a negation processing to be performed when a manual operation of the login user of the store terminal 300 has been accepted. In the following description, this update by the negation processing by hand may be called an update 3 so as to discriminate it from the above-described update 1 and update 2. For example, regarding the record, such as the fifth record of FIG. 4 (the information of "article" is "adhesive plaster"), in which the commodity code is unclear, it is detected by the operation device 302 (the touch panel) that the display position in the line of "adhesive plaster" in the shopping list 323a of the screen 301a shown in FIG. 6 has been subjected to a manual operation (for example, a touch operation). When this manual operation is detected, the information of "full name" of the login user of the store terminal 300 is registered in the information of "cart input" of the relevant record of the shopping memo information 323. By this means, the negation processing is performed. And the update instruction portion 314 sends an instruction to update the record of the shopping memo information 223 of the server 200 corresponding to the record of the shopping memo information 323 which has been changed by this update 3 to the update accepting portion 212 of the server 200. That is, the above-described update instruction portion 314 sends an instruction to update the record of the shopping memo information 223 of the server 200 corresponding to the record of the shopping memo information 323 which has been changed by each of the updates 2, 3 based on the manual and automatic negation processings to the update accepting portion 212 of the server 200.

Figure 7:
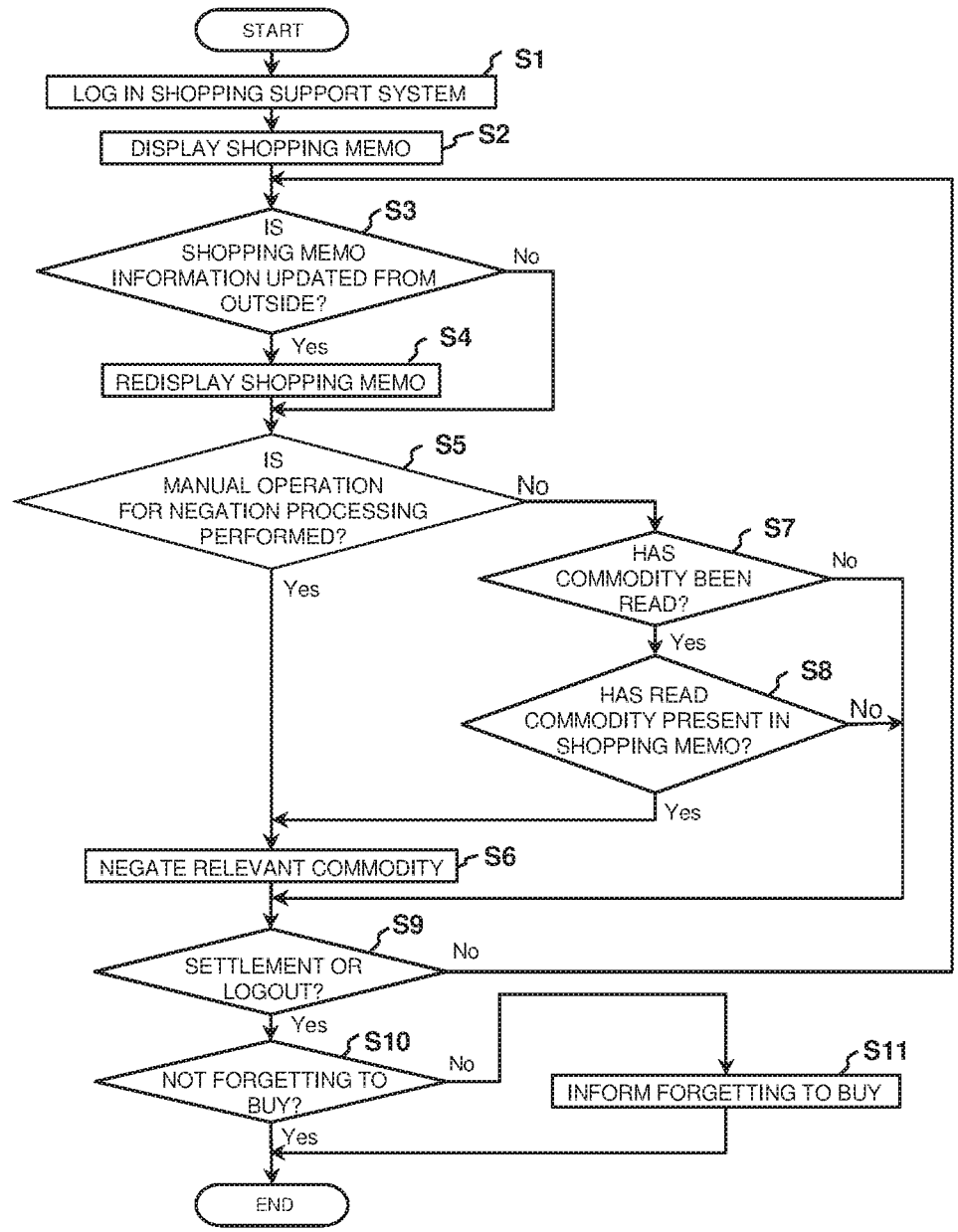
FIG. 7 is a flow chart showing an example of a shopping support processing according to the embodiment.

FIG. 7 is a flow chart showing an example of a shopping support processing by the shopping support system 100. To begin with, in a step S1, the controller 310 of the store terminal 300 accepts, as the user information acquisition portion 311, that a user logs in the shopping support system 100. Specifically, the controller 310 (the user information acquisition portion 311) intermediates user authentication by the controller 210 (the user authentication portion 211) of the server 200. By this means, the user logs in the shopping support system 100.

Subsequently, in a step S2, the controller 310 of the store terminal 300 makes, as the memo display processing portion 312, the display device 301 display the shopping list 323a based on the shopping memo information 323. Specifically, the controller 310 (the memo display processing portion 312) acquires the records of the shopping memo information 223 corresponding to the login user of the store terminal 300 and another user of the group to which the login user belongs, from the shopping memo information 223 of the server 200. The controller 310 makes the storage device 320 store the acquired records, as the shopping memo information 323. Further, the controller 310 makes the display device 301 display the shopping list 323a based on this stored shopping memo information 323 (the above-described acquired records).

Next, in a step S3, the controller 310 judges the presence or absence of update with respect to the shopping memo information 323 from the outside. The update from the outside here is the above-described update 1, for example. Specifically, the controller 310 (the memo display processing portion 312) repeatedly re-acquires the record of the shopping memo information 323 corresponding to the login user at a periodic prescribed timing, and thereby judges the presence or absence of the update (the update 1) of the shopping memo information 323 from the outside. When the controller 310 judges that the shopping memo information 323 has been updated from the outside (Yes of step S3), the processing of the controller 310 proceeds to a step S4. In the step S4, the controller 310 makes the display device 301 redisplay the shopping list 323a based on the shopping memo information 323. Specifically, the controller 310 displays the shopping memo information 323 which has been updated with the above-described re-acquired new record. In addition, when the controller 310 judges that the shopping memo information 323 has not been updated from the outside (No of step S3), the processing of the controller 310 skips the step S4, and proceeds to a step S5.

Next, in the step S5, the controller 310 judges, as the update instruction portion 314, whether a manual operation for the negation processing has been performed. Specifically, the controller 310 judges whether the manual operation for the negation processing has been performed, based on the detection result of the operation device 302. If the operation device 302 detects the manual operation (the touch operation) for the negation processing, the controller 310 judges that the manual operation for the negation processing has been performed (Yes of step S5), and the processing of the controller 310 proceeds to a step S6. In the step S6, the controller 310 performs the above-described negation processing to the record of the relevant commodity included in the shopping memo information 323.

In addition, when the controller 310 judges that the manual operation for the negation processing has not been performed (No of step S5), the processing of the controller 310 proceeds to a step S7. In the step S7, the controller 310 judges, as the commodity information processing portion 313, whether a commodity code has been read. Specifically, the controller 310 judges whether the commodity code has been read, based on whether the controller 310 has received an output of the commodity code from the reading device 303. When the controller 310 judges that the commodity code has been read, based on that the controller 310 has been received the output of the commodity code from the reading device 303 (Yes of step S7), the processing of the controller 310 proceeds to a step S8. In the step S8, the controller 310 judges, as the update instruction portion 314, whether the read commodity code is included in the shopping memo information 323. When the controller 310 judges that the read commodity code is included in the shopping memo information 323 (Yes of step S8), the processing of the controller 310 proceeds to the above-described step S6.

After the processing of the above-described step S6, the processing of the controller 310 proceeds to a step S9. In addition, when the controller 310 judges that the commodity code has not been read in the above-described step S7 (No of step S7), the processing of the controller 310 similarly proceeds to the step S9. In addition, when the controller 310 judges that the commodity code read in the above-described step S8 is not included in the shopping memo information 323 (No of step S8), the processing of the controller 310 similarly proceeds to the step S9.

In the step S9, the controller 310 judges whether an operation of a user to declare intention of settlement or logout has been performed, via the operation device 302, for example. The information of "settlement" here indicates adjustment with respect to the commodity corresponding to the commodity information 321 stored in the storage device 320 of the store terminal 300, and completion of payment thereof. For example, when the relevant store 600 employs a semi-self-system, adjustment of the total money amount based on the commodity information 321 and payment of the money thereof are performed, by means of a terminal or an accounting machine which a salesclerk operates. When the operation device 302 accepts an operation of the user indicating intention to preform settlement or logout, the controller 310 judges that the operation to declare intention of settlement or logout has been performed at a stage in which the settlement or the logout has not been performed (Yes of step S9). In addition, when the operation device 302 does not accept the operation of the user indicating intention to perform settlement or logout, the controller 310 judges that the operation to declare intention of settlement or logout has not been performed (No of step S9).

When the controller 310 judges that the operation to declare intention of settlement or logout has been performed as described above, (Yes of step S9), the processing of the controller 310 proceeds to a step S10. In the step S10, the controller 310 judges whether the user has not forgotten to buy the commodity to be purchased. Specifically, the controller 310 judges whether the user has not forgotten to buy the commodity to be purchased, with reference to the information of "cart input" included in the shopping memo information 323. When the controller 310 judges that the user has not forgotten to buy the commodity to be purchased (Yes of step S10), the controller 310 finishes the processings shown in FIG. 7. When the controller 310 judges that the user has forgotten to buy the commodity to be purchased (No of step S10), the processing of the controller 310 proceeds to a step S11. In the step S11, the controller 310 informs the login user of the store terminal 300 of that the user has possibly forgotten to buy the commodity to be purchased (refer to FIG. 8 described later), and finishes the processings shown in FIG. 7.

FIG. 8 is a diagram showing an example of an alert display in the screen 301a of the shopping list 323a based on the shopping memo information 323. In the case of the state of the screen 301a shown in FIG. 8, records in each of which the login user (full name: A) is registered as the information of "possible purchaser" and records in each of which the information of "possible purchaser" is not limited ("-" as display) are displayed. Out of these records, each of the records in which the informations of "article" are "commodity B" and "adhesive plaster", data of "not yet" is registered in the information of "cart input". As described above, the data of "not yet" is data indicating a state in which a commodity corresponding to the name of the commodity registered in the information of "article" has not been inputted into the cart. The controller 310 judges whether the user has not forgotten to buy the commodity to be purchased, based on whether the data of "not yet" is registered in the information of "cart input". When judging that the user has forgotten to buy the commodity to be purchased in the shopping memo information 323, the controller 310 functions as an example of an informing portion, and displays the shopping list 323a based on the shopping memo information 323, and performs an alert display for warning of forgetting to buy. The controller 310 makes the display device 301 display, as the alert display, the name of the commodity which the user has possibly forgotten to buy, along with a wording such as "Have you not forgotten to buy commodity? Please confirm.". Further, the controller 310 makes the display device 301 display an "OK" button, or the like, for erasing the relevant alert display and making another operation to be acceptable.

In addition, when the login user (full name: A) inputs the commodity C which the user (full name: B) other than the login user (full name: A) of the store terminal 300 has inputted into the cart, into the cart, the controller 310 performs an alert display for warning of duplication. For example, the controller 310 makes the display device 301 display, as the alert display of this case, a wording such as "Other user has inputted relevant commodity into cart (or has purchased). Please, confirm.". More preferably, the controller 301 makes the display device 301 display also the name of the commodity, and so on, having a possibility of duplication, as the alert display in the above-described case. In addition, the controller 310 makes the display device 301 display the "OK" button for erasing the relevant alert display and making another operation to be acceptable, with being included in the alert display.

In the shopping support system 100 like this, before shopping, a user previously accesses the server 200 from the user terminal 400 or the PC 401 to create the shopping memo information 223. Next, in the store 600 where the user has visited, the user makes the store terminal 300 provided in the shopping cart 601 read a bar code which has been made to be displayed on the user terminal 400, and thereby logs in the store terminal 300. Next, the user performs shopping while looking at the shopping list 323a based on the shopping memo information 323 which is displayed on the store terminal 300. The shopping memo information 323 is updated at any time. Next, the user makes the reading device 303 of the store terminal 300 read a bar code of a commodity which is to be inputted into the shopping cart 601. In accordance with reading of the bar code of the commodity by the reading device 303, the controller 310 of the store terminal 300 performs a negation processing of the record of the relevant commodity in the shopping memo information 323. In addition, regarding the commodity which has not automatically been subjected to the negation processing by reading of the bar code (reading of the commodity code), though the information of the corresponding commodity exists in the shopping list 323a, the user performs a touch operation to a display position of the information of the relevant commodity. In accordance with this touch operation, the controller 310 of the store terminal 300 performs the negation processing of the record of the relevant commodity in the shopping memo information 323. When having finished inputting the whole commodities which the user has intended to purchase into the shopping cart 601, the user performs an operation to indicate intention of settlement or logout, in the operation device 302 of the store terminal 300. At this time, if a commodity which the relevant user has to purchase or may purchase remains in the shopping memo information 323 (the shopping list 323a), the commodity which the user has possibly forgotten to buy is guide-displayed on the display device 301 of the store terminal 300 (refer to FIG. 8).

In this manner, according to the shopping support system 100 of the present embodiment, the user can perform shopping while confirming update of the shopping memo information in real time. By this means, even in the shopping with reference to the shopping memo information shared by a plurality of persons, it is possible to prevent duplicate purchase. Further, when a plurality of users respectively input the same commodities in the shopping carts 601 in duplication, it is possible to more prevent duplicate purchase, by the alert display on the display device 301 of the store terminal 300. In addition, according to the shopping support system 100 of the present embodiment, since a possibility of forgetting to buy the commodity can be informed, the shopping support system 100 is effective for preventing forgetting to buy the commodity to be purchased.

The server 200 in the present embodiment has a controller including a CPU and a memory such as a ROM (Read Only Memory) and a RAM, an external storage device such as an HDD, a CD drive device, a display device such as a display, and an input device such as a keyboard and a mouse. That is, the server 200 has a hardware configuration using a usual computer.

The program to be executed in the server 200 of the present embodiment is provided while being recorded in a computer readable recording medium, such as a CD-ROM, a flexible disk (FD), a CD-R, a DVD (Digital Versatile Disk), in a file of an installable format or an executable format.

In addition, the program to be executed in the server 200 of the present embodiment may be configured to be stored on a computer connected to a network such as Internet, and to be provided by being downloaded through the network. In addition, the program to be executed in the server 200 of the present embodiment may be configured to be provided or distributed via a network such as Internet.

In addition, the program to be executed in the server 200 of the present embodiment may be configured to be provided while being previously incorporated in a memory such as a ROM.

The program to be executed in the server 200 of the present embodiment has a module configuration including the above-described respective portions (the user authentication portion 211, the update accepting portion 212, the update processing portion 213). The controller (the CPU) reads the program from the memory or the storage device and executes it to load the above-described respective portions in the memory. By this means, the user authentication portion 211, the update accepting portion 212, the update processing portion 213 are generated in the memory.

Further, the program to be executed in the store terminal 300 in the present embodiment is provided while being previously incorporated in a storage device such as a ROM.

The program to be executed in the store terminal 300 of the present embodiment may be configured to be provided while being recorded in a computer readable recording medium, such as a CD-ROM, a flexible disk (FD), a CD-R, a DVD (Digital Versatile Disk), in a file of an installable format or an executable format.

Further, the program to be executed in the store terminal 300 of the present embodiment may be configured to be stored on a computer connected to a network such as Internet, and to be provided by being downloaded through the network. In addition, the program to be executed in the store terminal 300 of the present embodiment may be configured to be provided or distributed via a network such as Internet.

The program to be executed in the store terminal 300 of the present embodiment has a module configuration including the above-described respective portions (the user information acquisition portion 311, the memo display processing portion 312, the commodity information processing portion 313, the update instruction portion 314). The controller (the CPU) reads the program from the memory and executes it to load the above-described respective portions in the memory. By this means, the user information acquisition portion 311, the memo display processing portion 312, the commodity information processing portion 313, the update instruction portion 314 are generated in the memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shopping support system to support shopping of a user in a store, comprising:
a shopping terminal which is attachable to a shopping cart in the store and is to be used by a first user when the first user takes one or more commodities to be purchased into the shopping cart; and
a server connected to the shopping terminal over a network;
the server having:
a first storage device to store user identification information of the first user, which includes a group ID of a group to which the first user and one or more other users belong, and group shopping memo information which is associated with the group ID and includes commodity information of one or more commodities to be purchased by one or more users in the group,
a first communication device to perform communication with the shopping terminal, and
a first controller which
receives an update instruction of the group shopping memo information from a terminal of a second user belonging to the group via the first communication device, and
updates the group shopping memo information based on the received update instruction, and makes the first storage device store the updated group shopping memo information,
the shopping terminal having
a display device to display a shopping list based on the group shopping memo information,
an input device to input information necessary for the first user to perform shopping,
a code reader to perform a commodity code read for commodity registration,
a second communication device to perform communication with the server, and
a second controller which
acquires user information of the first user via the input device, and permits login of the first user based on the acquired user information,
repeatedly acquires the group shopping memo information associated with the group ID from the server via the second communication device,
makes the display device display the shopping list, based on the acquired group shopping memo information,
when a commodity code is read by the code reader, determines whether the commodity code is included in the group shopping memo information acquired from the server, and
when the commodity code is included in the group shopping memo information acquired from the server, transmits an update instruction of the group shopping memo information with respect to a commodity identified by the commodity code to the server, via the second communication device, such that the group shopping memo information indicates that the commodity identified by the commodity code has been registered by the first user.

2. The shopping support system according to claim 1, wherein:
the shopping terminal further has a second storage device to store the information of the commodity identified by the commodity code; and
the second controller makes the second storage device store the information of the commodity identified by the commodity code.

3. The shopping support system according to claim 1, wherein:
the first communication device further performs communication with a terminal device carried by the user; and
the first controller acquires the commodity information of the one or more commodities to be purchased by the one or more users in the group from the terminal device via the first communication device, creates the group shopping memo information based on the acquired commodity information of the one or more commodities to be purchased, and makes the first storage device store the created group shopping memo information.

4. The shopping support system according to claim 1, wherein:

when an operation for logout by the first user is inputted via the input device, the second controller determines whether there is a non-registered commodity in the shopping list that has not been registered by any user in the group based on the acquired group shopping memo information and, upon determining that there is a non-registered commodity, makes the display device display commodity information of the non-registered commodity.

5. The shopping support system according to claim 1, wherein:

when an operation for settlement by the first user is inputted via the input device, the second controller determines whether there is a non-registered commodity in the shopping list that has not been registered by any user in the group based on the acquired group shopping memo information and, upon determining that there is a non-registered commodity, makes the display device display commodity information of the non-registered commodity.

6. The shopping support system according to claim 1, wherein:

the update instruction of the group shopping memo information from the terminal of the second user includes addition of a commodity to the group shopping memo information; and the first controller updates the group shopping memo information by indicating addition of the commodity in the group shopping memo information based on the update instruction from the terminal of the second user.

7. The shopping support system according to claim 1, wherein:

the update instruction of the group shopping memo information from the terminal of the second user includes registration of a commodity in the shopping list; and the first controller updates the group shopping memo information by indicating registration of the commodity by the second user in the group shopping memo information based on the update instruction from the terminal of the second user.

8. The shopping support system according to claim 1, wherein:

the update instruction of the group shopping memo information from the terminal of the second user includes purchase of a commodity in the shopping list by the second user; and the first controller updates the group shopping memo information by indicating purchase of the commodity by the second user in the group shopping memo information based on the update instruction from the terminal of the second user.

* * * * *